(12) United States Patent
Watanabe et al.

(10) Patent No.: US 7,173,664 B2
(45) Date of Patent: Feb. 6, 2007

(54) IMAGE SIGNAL PROCESSOR WITH REDUCED POWER CONSUMPTION

(75) Inventors: Tohru Watanabe, Ogaki (JP); Takashi Tanimoto, Gifu-ken (JP); Tatsuya Takahashi, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 751 days.

(21) Appl. No.: 10/208,588

(22) Filed: Jul. 30, 2002

(65) Prior Publication Data
US 2003/0026615 A1     Feb. 6, 2003

(30) Foreign Application Priority Data
Aug. 1, 2001    (JP) ............................ 2001-233806
Apr. 10, 2002   (JP) ............................ 2002-107735

(51) Int. Cl.
*H04N 5/225*     (2006.01)

(52) U.S. Cl. ..................................................... 348/372
(58) Field of Classification Search ..................... None
See application file for complete search history.

(56) References Cited

U.S. PATENT DOCUMENTS

| 5,493,409 | A |   | 2/1996 | Maeda et al. |
| 5,963,255 | A | * | 10/1999 | Anderson et al. ............ 348/372 |
| 6,236,262 | B1 | * | 5/2001 | Mellot ......................... 327/540 |
| 6,377,073 | B1 | * | 4/2002 | Krasnansky .................. 326/82 |
| 6,856,352 | B1 | * | 2/2005 | Kijima ......................... 348/312 |
| 2003/0043287 | A1 |   | 3/2003 | Kakiuchi et al. |
| 2003/0200473 | A1 |   | 10/2003 | Fung |
| 2003/0218690 | A1 | * | 11/2003 | Sakaegi ....................... 348/372 |
| 2004/0120690 | A1 | * | 6/2004 | Takeshita et al. ............. 386/46 |

FOREIGN PATENT DOCUMENTS

| JP | 63-246081 |   | 10/1988 |
| JP | 02-082774 |   | 3/1990 |
| JP | 02-248170 | * | 3/1990 |

(Continued)

OTHER PUBLICATIONS

"TLC876M Analog-To-Digital Converters" Texas Instruments SLAS140E- Jul. 1997—Revised Oct. 2000.*

(Continued)

*Primary Examiner*—Ngoc-Yen Vu
*Assistant Examiner*—Hung Lam
(74) *Attorney, Agent, or Firm*—Fish & Richardson P.C.

(57) ABSTRACT

An image signal processor for reducing power consumption. The image signal processor is connected between a solid-state imaging device, which generates a first image signal, and an external device, and includes first and second regulators, a switch circuit, a signal processing circuit, and an output circuit. The first regulator generates a first voltage that is in accordance with an output level of the solid-state imaging device. The second regulator generates a second voltage that is in accordance with an input level of the external device. The switch circuit supplies the power supply voltage or the second voltage to the output circuit in accordance with the operating state of the imaging external device. The signal processing circuit operates with the first voltage and generates a second image signal. The output circuit provides the second image signal to the external device.

12 Claims, 7 Drawing Sheets

FOREIGN PATENT DOCUMENTS

| | | |
|---|---|---|
| JP | 02-248170 | 10/1990 |
| JP | 10-150766 | 6/1998 |
| JP | 10-174048 | 6/1998 |
| JP | 10-337001 | 12/1998 |
| JP | 11-331682 | 11/1999 |

OTHER PUBLICATIONS

Ackland et al., "Camera on a Chip", IEEE, Feb. 8, 1996, pp. 22-26.

"TLC876M Analog-To-Digital Converters" Texas Instruments SLAS140E Jul. 1997—Revised Oct. 2000.

* cited by examiner

IMAGE SIGNAL PROCESSOR WITH REDUCED POWER CONSUMPTION

BACKGROUND OF THE INVENTION

The present invention relates to an image signal processor for performing a predetermined signal processing on an image signal output from a solid-state imaging device to generate an image signal complying to a predetermined format.

An imaging apparatus using a solid-state imaging device (CCD image sensor), such as a digital still camera, often uses a battery as a power supply. The range of the output voltage of a battery is limited. Therefore, a regulator or a booster is employed to drive the CCD image sensor.

FIG. 1 is a schematic block diagram of a prior art imaging apparatus 50. The imaging apparatus 50 includes a regulator 2, a CCD image sensor 3, a drive device 4, and an image signal processor 7. The signal processor 7 includes a horizontal driver 8, a signal processing circuit 9, a timing control circuit 13, and an output circuit 14.

The regulator 2 is supplied with power supply voltage from a battery. The regulator 2 converts the power supply voltage to a predetermined voltage Vk. The imaging apparatus 50 is operated with the same operational voltage Vk, which is generated by the imaging device.

The CCD image sensor 3 is, for example, a frame transfer type, and includes an imaging section 3a, a charge section 3b, a horizontal transfer section 3c, and an output section 3d. The imaging section 3a has a plurality of light receiving pixels for storing information charges generated in response to the received light. The charge section 3b temporarily stores the information charges corresponding to a single screen image that is retrieved from the imaging section 3a. The horizontal transfer section 3c sequentially retrieves the information charges from the charge section 3b and sequentially transfers the information charges in the horizontal direction in units of single pixels. The output section 3d receives information charges from the horizontal transfer section 3c, converts the information charges in units of single pixels to voltage values corresponding to the information charges, and generates an image signal Y(t). The image signal Y(t) is provided to the signal processor 7.

The drive device 4 includes a booster 5 and a vertical driver 6, which are formed on the same semiconductor substrate. The booster 5 includes a positive voltage generating charge pump and a negative voltage generating charge pump. The positive voltage generating charge pump increases the regulated voltage VK to a predetermined positive voltage VOH (e.g., 5V) and supplies the positive voltage VOH with the CCD image sensor 3. The negative voltage generating charge pump boosts the voltage to a predetermined negative voltage VOL (e.g., −5V) and supplies the negative voltage VOL with the vertical driver 6.

The vertical driver 6 functions in accordance with the negative voltage VOL and generates a frame transfer clock signal øf and a vertical transfer clock signal øv. The clock signals øf and øv are respectively provided to the imaging section 3a and the charge section 3b of the CCD image sensor 3. The frame transfer clock signal øf and the vertical transfer clock øv are generated in accordance with a frame shift timing signal FT, a vertical synchronizing signal VT, and a horizontal synchronizing signal HT, which are provided from the timing control circuit 13 of the signal processor 7. The information charges that are accumulated in the charge section 3b are line-transferred to the horizontal transfer section 3c at a timing that is in accordance with the vertical synchronizing signal VT and the horizontal synchronizing signal HT.

The horizontal driver 8 functions in accordance with the regulated voltage VK and generates a horizontal transfer clock signal øh. The horizontal transfer clock signal øh is provided to the horizontal transfer section 3c of the CCD image sensor 3. The horizontal transfer clock signal øh is generated in accordance with the vertical synchronizing signal VT and the horizontal synchronizing signal HT, which are provided from the timing control circuit 13 of the signal processor 7. The information charges retrieved in the horizontal transfer section 3c are horizontally transferred at a timing that is in accordance with the horizontal synchronizing signal HT and converted to an image signal Y(t) by the output section 3d.

The signal processing circuit 9 includes an analog processing circuit 10, an A/D converter 11, and a digital processing circuit 12. The analog processing circuit 10 receives an image signal Y(t) from the CCD image sensor 3 and performs an analog signal processing, such as a correlated double sampling (CDS) process and an automatic gain control (AGC) process, on the image signal Y(t). In the CDS process, the image signal Y(t), which repeats the reset level and the signal level, is clamped at the reset level. Subsequently, the signal level is extracted from the image signal Y(t) and an image signal having a continuous signal level is generated. In the AGC process, the image signals retrieved in the CDS process are integrated in units of single image screens or single vertical scan terms. The gain is feedback-controlled so that the integrated data is included in a predetermined range. The A/D converter 11 receives an image signal from the analog processing circuit 10, standardizes the image signal in synchronism with the image output timing of the CCD image sensor, and generates a digital image data signal Y(n). The digital image data Y(n) is provided to the digital processing circuit 12.

The digital processing circuit 12 performs processes such as color separation and a matrix operation on the digital image signal Y(n) to generate image data Y' (n), which includes a luminance signal and a chrominance signal. For example, in the color separation process, the digital processing circuit 12 separates the image data Y(n) in accordance with a color array of a color filter, which is attached to the imaging section 3a of the CCD image sensor 3, to generate a plurality of color component signals. In the matrix operation process, the digital processing circuit 12 generates the luminance signal by synthesizing the separated color components and generates the chrominance signal by subtracting luminance components from each color components.

The timing control circuit 13 includes a plurality of counters (not shown), which count a reference clock signal CK that has a constant cycle, and determines a vertical scan and horizontal scan timing of the CCD image sensor 3. The timing control circuit 13 divides the reference clock signal CK, which is provided via a clock supply terminal (not shown), to generate the frame timing signal FT, the vertical synchronizing signal VT, and the horizontal synchronizing signal HT. The timing control circuit 13 provides the analog processing circuit 10, the A/D converter 11, and the digital processing circuit 12 with a timing signal to synchronize the operations of the A/D converter 11 and the digital processing circuit 12 with the operational timing of the CCD image sensor 3.

The output circuit 14 operates with the regulated voltage Vk, receives the image data Y' (n) from the digital processing circuit 12 of the signal processing circuit 9, and provides the image data Y' (n) to external device including a central processing unit (CPU) 16, a memory 17, or a display driver 18 via a system bus 15. The CPU 16 centrally controls the operations of the imaging apparatus 50, the memory 17, and the display driver 18 in response to commands from peripheral devices. The memory 17 is a removable memory (e.g., flash memory, a memory card) or a fixed memory (e.g., hard disk), and stores image data Y' (n), which is provided from the imaging apparatus 50. The display driver 18 receives the image data Y' (n) from the imaging apparatus 50, drives the display panel 19, and displays a reproduced image.

In the signal processor of the imaging apparatus 50, after the regulator 2 regulates the power supply voltage VDD from the battery to a predetermined regulated voltage Vk, the regulated voltage Vk is commonly supplied to every circuit of the signal processor 7. Thus, the circuits of the signal processor 7 are supplied with the same power supply voltage. The value of the regulated voltage Vk is set in accordance with the operational voltage of the output circuit, which is normally greater than the operation voltage of the signal processing circuit 9. Therefore, even though the signal processing circuit 9 is operated by the power supply voltage, which is less that the regulated voltage Vk, the signal processing circuit 9 is supplied with the regulated voltage Vk, which is greater than the operational voltage. As a result, the signal processing circuit 9 consumes unnecessary power. This may increase the power consumption of the imaging apparatus 50.

In the prior art imaging apparatus 50, to suppress power consumption, the supply of the regulated voltage Vk to the signal processor 7 may be stopped when the signal processor 7 need not be operated. However, due to the following reasons, the level of the voltage supplied to the output circuit must constantly be in accordance with the level of the voltage input to the external device. Therefore, the supply of the power supply voltage cannot easily be stopped. For example, when the signal output from the CCD image sensor 3 is stopped and the external device is operating, current may flow through a system bus 15 from the external device to the output circuit 14 by stopping the supply of the power supply voltage. If the amount of current that flows in this state exceeds the tolerated current amount of the external device or the output circuit 14, the external device or the output circuit 14 may be broken. Accordingly, even if the signal processor 7 stops operating, the signal processor 7 must continuously be supplied with the power supply voltage as long as the external device is operating.

SUMMARY OF THE INVENTION

It is an object of the present invention to provide an image signal processor that reduces power consumption.

To achieve the above object, the present invention provides an image signal processor connected between a solid-state imaging device, which generates a first image signal, and an external device. The image signal processor includes a first regulator supplied with a power supply voltage to generate a first regulated voltage. The first regulated voltage is in accordance with an output level of solid-state imaging device. A second regulator is supplied with the power supply voltage to generate a second regulated voltage. The second regulated voltage is in accordance with an input level of the external device. A switch circuit is connected to the second regulator to select either one of the power supply voltage and the second regulated voltage in accordance with the operating state of at least one of the solid-state imaging device and the external device. A signal processing circuit is connected to the solid-state imaging device and the first regulator, supplied with the first regulated voltage from the first regulator, for operating with the first regulated voltage. The signal processing circuit receives the first image signal from the solid-state imaging device, performs a predetermined signal processing on the first image signal, and generates a second image signal that complies with a predetermined format. An output circuit is connected to the switch circuit and the signal processing circuit, for operating with the one of the power supply voltage and the second regulated voltage selected by the switch circuit. The output circuit provides the second image signal to the external device.

A further perspective of the present invention is a method for supplying power supply voltage to an image signal processor connected between a solid-state imaging device and an external device. The image signal processor includes a signal processing circuit for performing a predetermined signal processing on a first image signal to generate a second image signal, which complies with a predetermined format. An output circuit is connected to the signal processing circuit and the external device to provide the external device with the second image signal. The method includes receiving power supply voltage and generating a first regulated voltage that is in accordance with an output level of solid-state imaging device, receiving power supply voltage and generating a second regulated voltage that is in accordance with an input level of the external device, supplying the signal processing circuit with the first regulated voltage and the output circuit with the second regulated voltage when the solid-state imaging device and the external device are operating, supplying the signal processing circuit with a voltage at a ground level and the output circuit with the power supply voltage when the solid-state imaging device stop operating while the external device is operating, and supplying the signal processing circuit and the output circuit with the voltage at the ground level when the solid-state imaging device and the external device stop operating.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
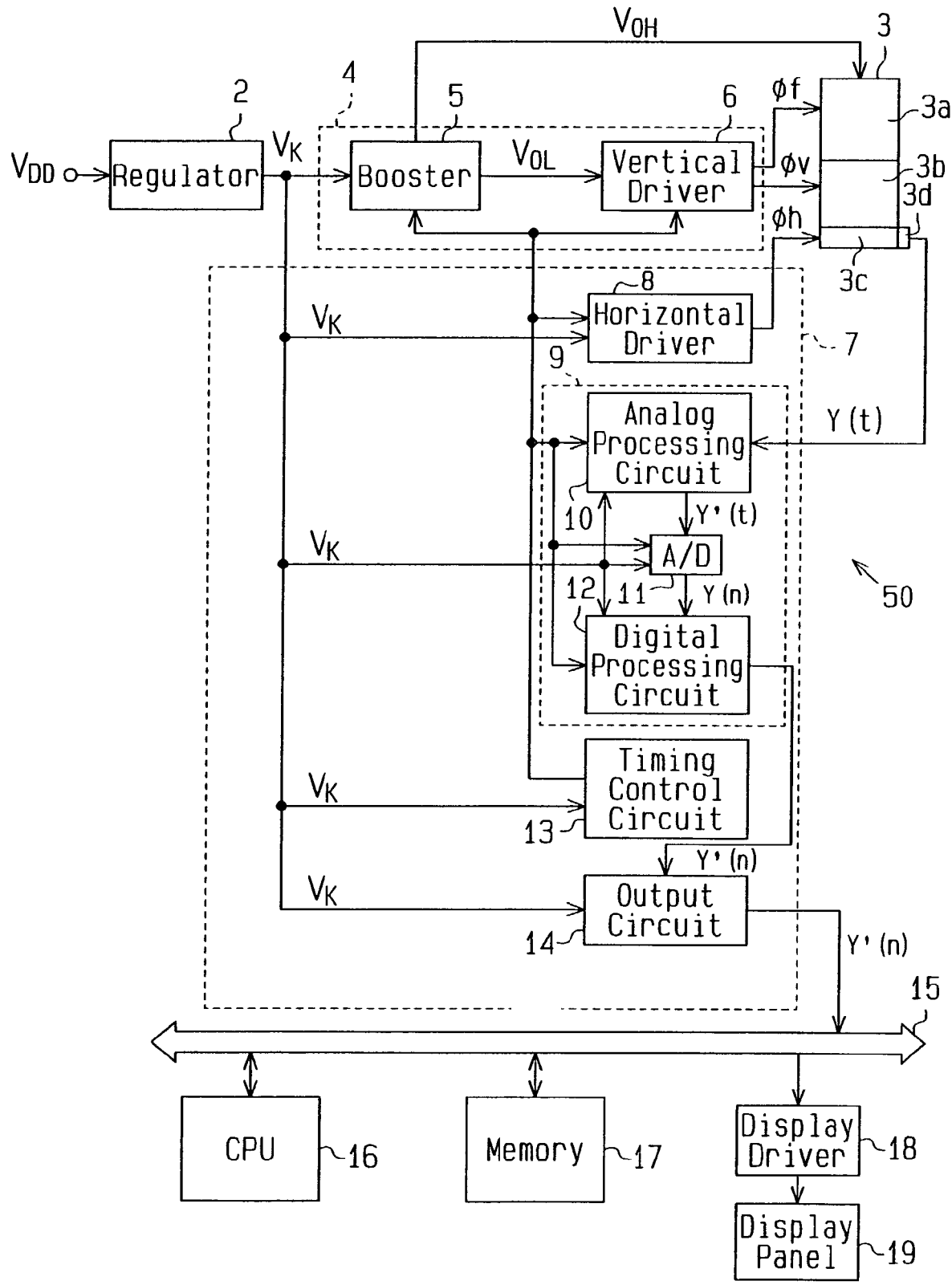
FIG. 1 is a schematic block diagram of a prior art imaging apparatus.

In the drawings, like numerals are used for like elements throughout.

Figure 2:
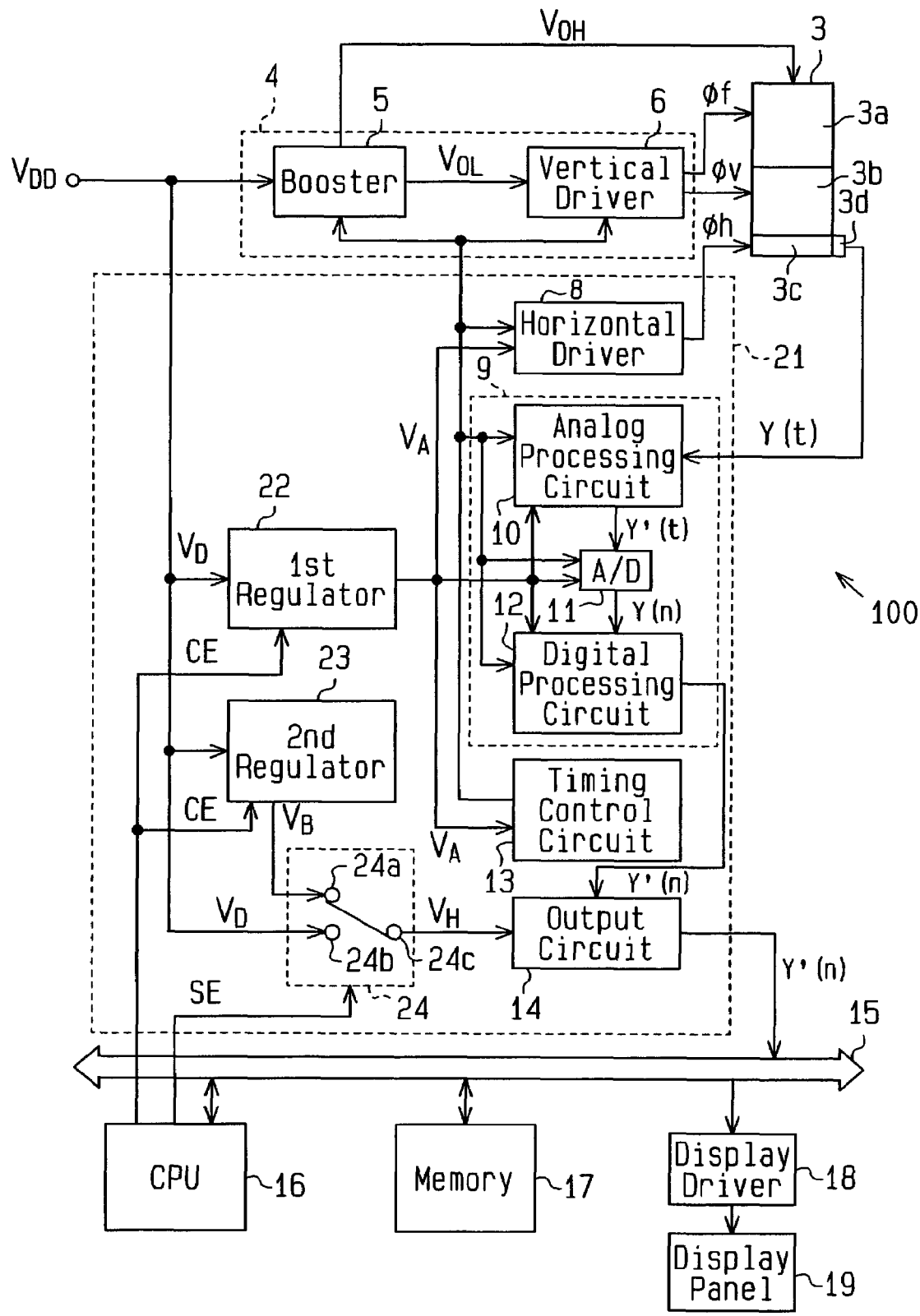
FIG. 2 is a schematic block diagram of an imaging apparatus having an image signal processor according to a first embodiment of the present invention.

FIG. 2 is a schematic block diagram of an imaging apparatus 100 having an image signal processor 21 according to a first embodiment of the present invention. The signal processor 21 of the first embodiment includes a horizontal driver 8, a signal processing circuit 9, and an output circuit 14. The signal processor 21 performs a predetermined signal processing on the image signals Y(t) provided from a CCD image sensor 3 to generate image data Y' (n), which includes a luminance signal and a chrominance signal. The image data Y' (n) is provided to external device including a CPU 16, a memory 17, or a display driver 18. Further, the signal processor 21 includes a first regulator 22, a second regulator 23, and a switch circuit 24. The first regulator 22 is connected to the horizontal driver 8 and the signal processing circuit 9. The second regulator 23 is connected to the output circuit 14 via the switch circuit 24.

The first and second regulators 22, 23 are each connected to a battery (not shown) via a power supply terminal (not shown) to receive a power supply voltage VDD from the battery. The first regulator 22 generates a first regulated voltage VA from the power supply voltage VDD. The second regulator 23 generates a second regulated voltage VB from the power supply voltage VDD. The first regulated voltage VA is substantially equal to the optimal functional voltage of the horizontal driver 8 and the signal processing circuit 9 (e.g., 2.0 to 2.5V). That is, the first regulated voltage VA is set in accordance with the level of the image signal Y(t), which is provided from the CCD image sensor 3. The second regulated voltage VB is set to correspond with the optimal operational voltage of the output circuit 14 (e.g., 2.9V), or the input level of external device.

In the signal processor 21 of the first embodiment, the first and second regulators 22, 23 respectively and independently supply the signal processing circuit 9 and the output circuit 14 with the regulated voltage. Thus, the signal processing circuit 9 and the output circuit 14 are each operated by an optimal power supply voltage. As a result, unnecessary power is not consumed. This reduces power consumption. Further, the output voltages of the regulators 22, 23 are set at the optimal voltages of the associated signal processing circuit 9 and the output circuit 14. Thus, the signal processing circuit 9 and the output circuit 14 are each supplied with the optimal operational voltage. This improves the operational characteristics of the signal processing circuit 9 and the output circuit 14.

The first and second regulators 22, 23 are operated in accordance with the operational state of the CCD image sensor 3. More specifically, the CPU 16 generates a control signal CE, which is in accordance with the operational state of the CCD image sensor 3. The regulators 22, 23 receive the control signal CE from the CPU 16 and operate in accordance with the control signal CE. When the CCD image sensor stops operating, the regulators 22, 23 stop outputting the first and second regulated voltages VA, VB and decrease the output potential to a ground potential VG (e.g., 0V) in accordance with the control signal CE. By stopping the operations of the regulators 22, 23 in accordance with the operational state of the CCD image sensor 3, the supply of the first and second regulated voltages VA, VB is stopped when the CCD image sensor 3 is not operating. Thus, unnecessary power is avoided when the CCD image sensor 3 is not operating.

The switch circuit 24 receives the power supply voltage VDD and the second regulated voltage VB and selectively provides either one of the power supply voltage VDD and the second voltage VB to the output circuit 14 in accordance with the input level of the external device. The switch circuit 24 includes two input terminals 24a, 24b and an output terminal 24c. The input terminal 24a is connected to the second regulator 23, and the input terminal 24b is connected to the power supply terminal. The output terminal 24c of the switch circuit 24 is connected to the output circuit 14. The switch circuit 24 receives the control signal SE from the CPU 16 and switches the output voltage VH in response to the control signal SE. The CPU 16 provides the switch circuit 24 with the control signal SE to switch the output voltage in accordance with the operational state of the CCD image sensor 3 and the external device. The switch circuit 24 selectively provides the output circuit 14 with either one of the power supply voltage VDD and the second regulated voltage VB in accordance with the control signal SE.

Figure 3:
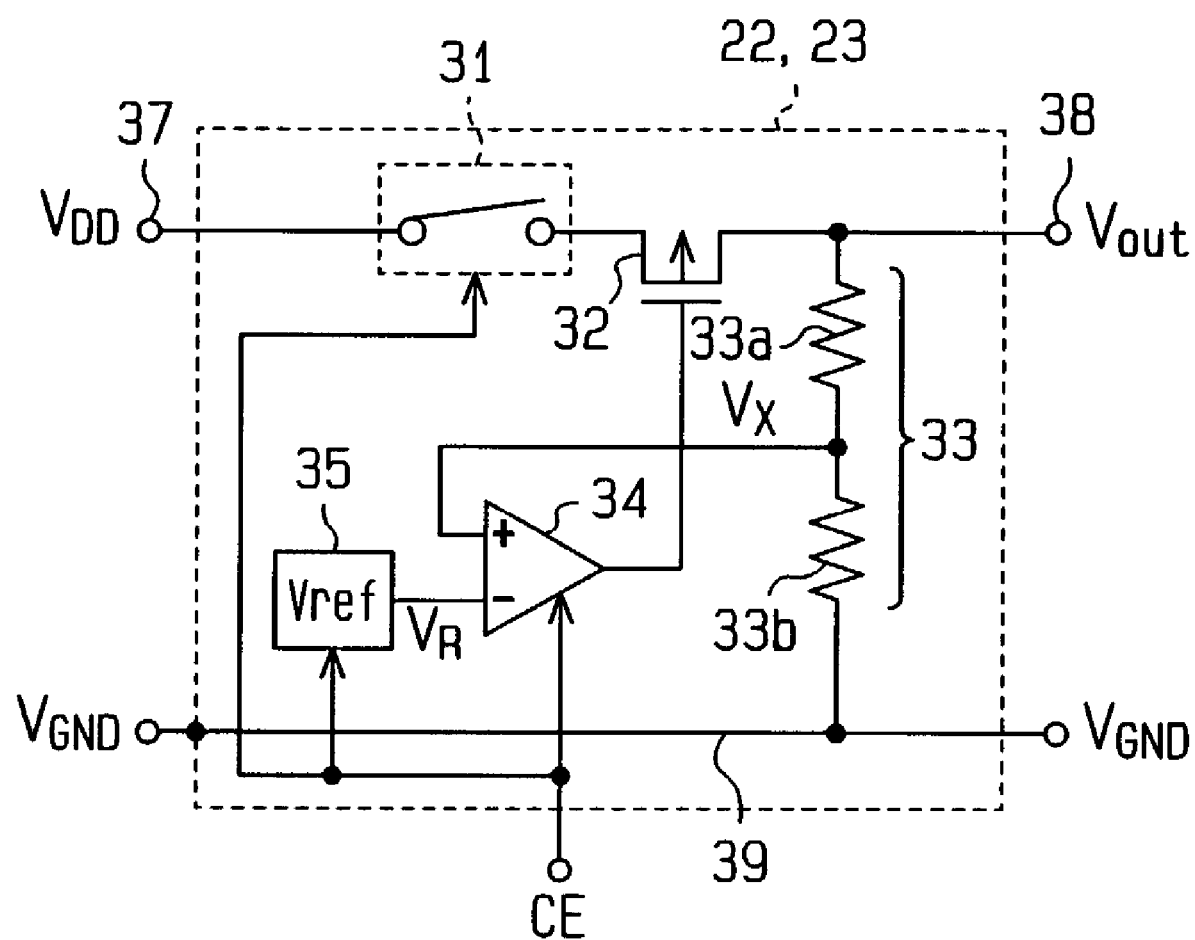
FIG. 3 is a schematic circuit diagram of a regulator of the image signal processor of FIG. 2.

FIG. 3 is a schematic circuit diagram of the first and second regulators 22, 23. The first and second regulators 22, 23 basically have the same configuration and each includes a switch 31, a p-channel transistor 32, a resistor string 33, a comparator 34, and a reference voltage generation circuit 35.

The switch 31 is connected between the power supply terminal 37 and the p-channel transistor 32. The p-channel transistor 32 is connected between the switch 31 and the output terminal 38. The gate of the p-channel transistor 32 is connected to the output terminal of the comparator 34. The resistor string 33 includes resistors 33a, 33b, which are connected in series between the drain of the p-channel transistor 32 and the ground. The median point between the resistor 33a and the resistor 33b are connected to a non-inverting terminal of the comparator 34. The reference voltage generation circuit 35 is connected to an inverting input terminal of the comparator 34.

The first and second regulators 22, 23 function in the following manner. The resistances of the resistor 33a and the resistor 33b are represented by R1 and R2. When the power supply voltage VDD is supplied via the power supply terminal, the p-channel transistor 32 goes on and the power supply voltage VDD is supplied to the resistor string 33. The resistor string 33 divides the power supply voltage VDD and generates a divided potential $VX=(R2/(R1+R2)) \cdot VDD$ at the median point of the resistor string 33. The divided potential VX is provided to the non-inverting input terminal of the comparator 34.

Then, the comparator 34, which functions in accordance with the potential difference between the divided potential VX and the reference voltage VR, controls the ON resistance of the p-channel transistor 32 so that the divided voltage VX and the reference voltage VR are equalized. More specifically, when the divided voltage VX is greater than the reference voltage VR, the comparator 34 causes the p-channel transistor 32 to go ON. When the divided voltage VX is less than the reference voltage VR, the comparator 34 causes the p-channel transistor 32 to go OFF. The first and second regulators 22, 23 each generate a constant voltage (regulated voltage) $VOUT=((R1+R2)/R2) \cdot VR$ from the ratio of the resistances R1, R2 of the resistors 33a, 33b and the reference voltage VR of the reference voltage generation circuit 35.

In the first and second regulators 22, 23, the dividing ratio of the resistor string 33 and the reference voltage VR are set in accordance with the optimum functional voltage of the following stage. This generates an optimal regulated voltage for the following stage.

The switch 31, the comparator 34, and the reference voltage generation circuit 35 receive the control signal CE from the CPU 16 and function in accordance with the operational state of the CCD image sensor 3. More specifically, when the level of the control signal CE corresponds to a state in which the CCD image sensor 3 is being operated, the switch 31 connects the power supply terminal 37 and the p-channel transistor 32. The reference voltage generation circuit 35 generates the reference voltage VR, and the comparator 34 controls the ON resistance of the p-channel transistor 32 to equalize the divided voltage VX and the reference voltage VR. When the level of the control signal CE corresponds to a state in which the CCD image sensor is not being operated, the switch 31 disconnects the power supply terminal 37 and the transistor 32. Thus, the comparator 34 and the reference voltage generation circuit 35 stops functioning.

Since the regulators 22, 23 stop functioning when the CCD image sensor 3 is not operating, the amount of power consumed by the regulators 22, 23 decreases. This further reduces the power consumption of the signal processor 21.

Figure 4:
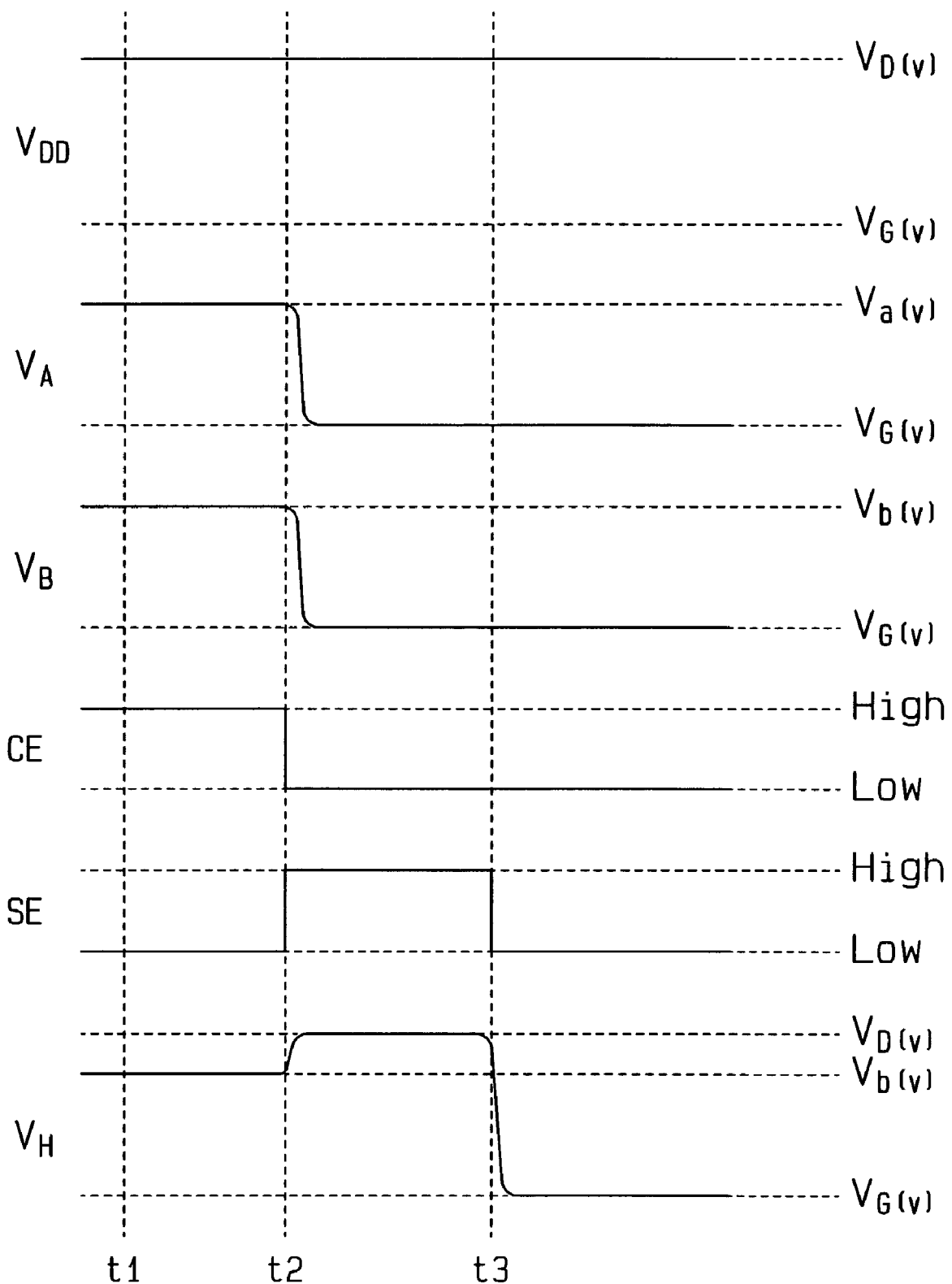
FIG. 4 is a timing chart illustrating the operation of the image signal processor of FIG. 1.

FIG. 4 is a timing chart illustrating the operation of the signal processor 21. In FIG. 4, the control signal CE, which is output from the CPU 16, is high when the CCD image sensor 3 is operating and low when the CCD image sensor 3 is not operating. The control signal SE, which is output from the CPU 16, is high when the output voltage VH is switched to the power supply voltage VDD and low when the output voltage VH is switched to the second regulated voltage VB.

Hereinafter, the value of the power supply voltage VDD is represented by VD[V], and the values of the first and second regulated voltages VA, VB generated by the first and second regulators 22, 23 are represented by Va[V], Vb[V], respectively. Further, the voltage value of the ground VGND is represented by VG[V].

At timing t1 in FIG. 4, the CCD image sensor 3 and the external device are being driven. In this state, the control signal CE is high, and the control signal SE is low. In response to the control signal CE, the first and second regulators 22, 23 receive the power supply voltage VD[V] (e.g., 3.2V) and generate Va[V] (e.g., 2.0V to 2.5V), as the first regulated voltage VA, and Vb[V] (e.g., 2.9V), as the second regulated voltage, respectively.

When the control signal SE goes low, the switch circuit 24 connects the input terminal 24a and the output terminal 24c to select the second regulated voltage VB (Vb[V]) as the output voltage VH. Accordingly, the output circuit 14 is supplied with the voltage Vb[V]. In this state, the signal processing circuit 9 performs a predetermined signal processing on the image signal Y(t), which is provided from the CCD image sensor 3.

Then, at timing t2, the CCD image sensor 3 stops operating but the external device continues to operate. In this state, the control signal CE goes low, and the control signal SE goes high. In response to the low control signal CE, the first and second regulators 22, 23 stops outputting the associated first and second regulated voltages VA, VB. Thus, the output voltages of the first and second regulators 22, 23 are set at VG[V] (e.g., 0V).

In response to the high control signal SE, the switch circuit 24 connects the input terminal 24b and the output terminal 24c and selects the power supply voltage VDD as the output voltage VH. This stops supplying the signal processing circuit 9 with the operational voltage and supplies only the output circuit 14 with the operational voltage VD[V]. In this state, the output of the output circuit 14 is set at a high impedance state. This prevents current from flowing from the external device to the output circuit 14. Accordingly, the supply of the power supply voltage to the signal processing circuit 9 is stopped while maintaining connection between the signal processor 21 and the external device. In other words, even though the external device is operating, the supply of the power supply voltage to the signal processing circuit 9 is stopped in accordance with the operating state of the CCD image sensor 3.

At timing t3, in addition to the CCD image sensor 3, the operation of the external device is stopped. In this state, the control signal CE is held at a low level, and the control signal SE goes low. In response to the low control signal SE, the switch circuit 24 selects the second regulated voltage VB while the first and second regulators 22, 23 continue to stop the output of the first and second regulated voltages VA, VB. This stops supplying the output circuit 14 with the power supply voltage. Accordingly, when the CCD image sensor 3 and the external device are not operating, the signal processing circuit 9 and the output circuit 14 are not supplied with the power supply voltage.

The stopping of the supply of power supply voltage to the signal processing circuit 9 and the output circuit 14 is especially effective when the signal processor 21 functions using an external battery as a power source. When the power supply side does not have a means for cutting the supply of power from the battery, the signal processor 21 may be supplied with the power supply voltage even if the entire system, which includes the CCD image sensor 3 and the external device, is not operating. If the power supply voltage is supplied, this may cause a current leak in a circuit even if the signal processing circuit 9 and the output circuit 14 are not functioning. This would virtually result in power consumption. Accordingly, since the supply of power supply voltage from the battery is stopped when the CCD image sensor 3 and the external device are not operating, the current leaks that occur at the circuits 9, 14 are prevented from occurring. This avoids unnecessary power consumption.

The signal processor 21 does not necessarily have to be supplied with the limited power supply voltage from the battery and may be supplied with regulated power supply voltage. Under such condition, the value of the regulated voltage may be set at the input level of the external device, or at the power supply voltage required by the output circuit 14 (e.g., 2.9V).

In such a case, when the CCD image sensor 3 is operating, the switch circuit 24 selects the regulated power supply voltage VDD. As a result, the regulated power supply voltage VDD is directly supplied to the output circuit 14 and not by way of the second regulator 23. This suppresses power consumption. When the power supply voltage is supplied via a regulator, power is consumed in a state in which a relatively large voltage drop occurs at the regulator. However, such power consumption is avoided by directly supplying the output circuit 14 with the power supply voltage VDD. Further, the signal processor 21 operates in the same manner as illustrated in FIG. 4 when the external device is operating. When the external device is operating, the switch circuit 24 selects the power supply voltage VDD and maintains the connection state of the system bus. When the external device stops operating, the switch circuit 24 selects the second regulated voltage VB and stops supplying the output circuit 14 with the power supply voltage.

Figure 5:
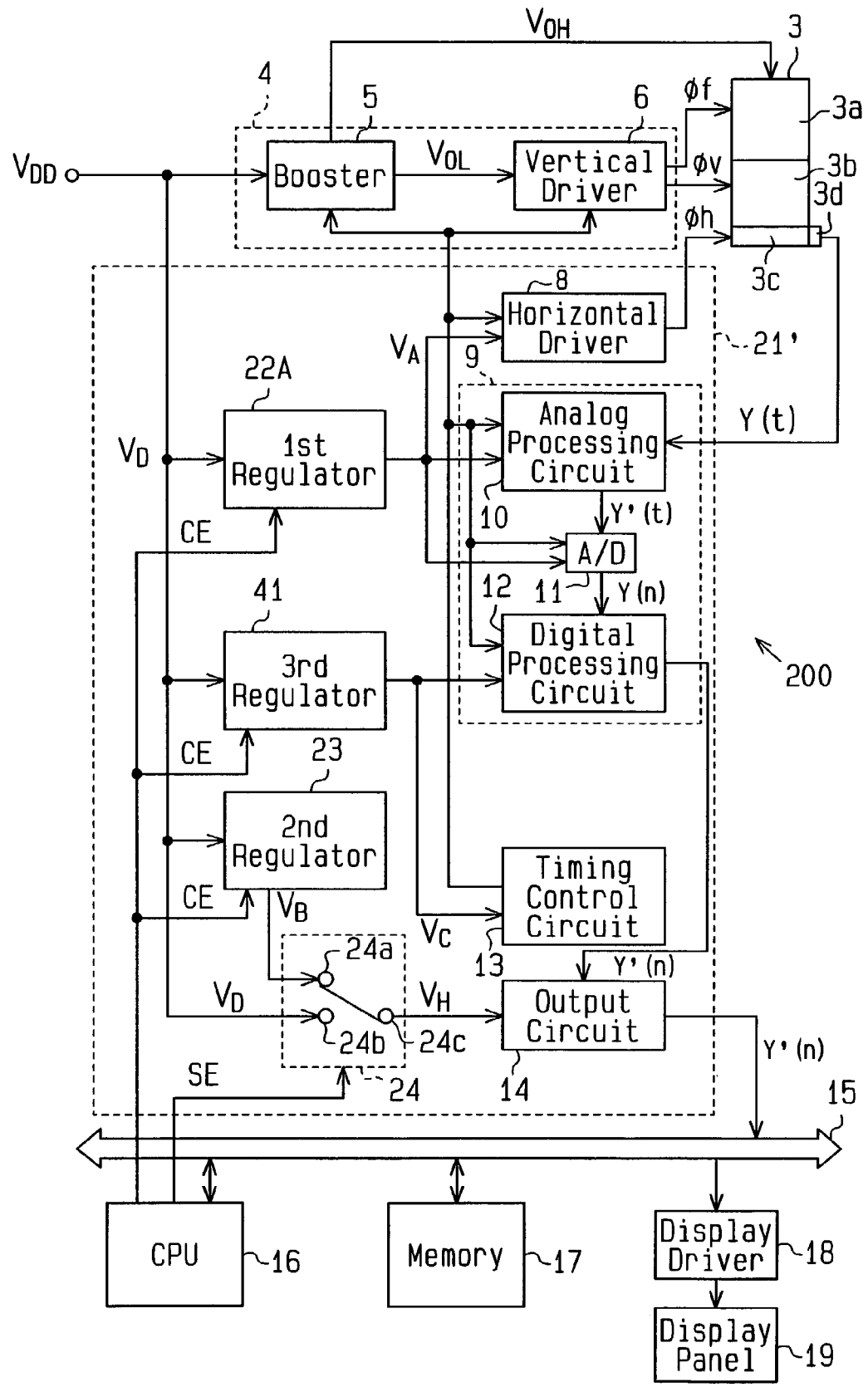
FIG. 5 is a schematic block diagram of an imaging apparatus having an image signal processor according to a second embodiment of the present invention.

FIG. 5 is a schematic block diagram of an imaging apparatus 200 having an image signal processor 21' according to a second embodiment of the present invention. As shown in FIG. 5, in addition to the configuration of the signal processor 21 of FIG. 2, the signal processor 21' further includes a third regulator 41.

A first regulator 22A of the signal processor 21' is connected to the analog processing circuit 10 and the A/D converter 11. The third regulator 41 is connected to the digital processing circuit 12 and the timing control circuit 13.

The first regulator 22A generates a voltage that is substantially equal to the optimum operational voltage of the analog processing circuit 10 and the A/D converter 11 (e.g., 2.5V). The first regulator 22A, which is supplied with the power supply voltage VDD from the battery (not shown), generates the first regulated voltage VA. The second regulator 23, which is supplied with the power supply voltage VDD from the battery, generates the second regulated voltage VB (e.g., 2.9V), which is greater than the first regulated voltage VA.

The third regulator 41 generates a voltage that is substantially equal to the optimum operational voltage of the digital processing circuit 12 and the timing control circuit 13 (e.g., 2.0V). The third regulator 41, which is supplied with the power supply voltage VDD from the battery, generates a third regulated voltage VC, which is less than the first regulated voltage VA.

In the signal processor 21' of the second embodiment, the analog processing circuit 10 and the digital processing circuit 12 are each provided with a regulator. Thus, the analog processing circuit 10 and the digital processing circuit 12 are each supplied with the optimal power supply voltage. This improves the operational characteristics of the signal processing circuit 9 and the output circuit 14. The third regulator 41 generates the third regulated voltage VC, which is less than the first regulated voltage VA, and supplies the digital processing circuit 12 independently with the third regulated voltage VC. Since the digital processing circuit 12 is supplied with the optimal power supply voltage, the power consumption of the digital processing circuit 12 is reduced.

The configuration of the third regulator 41 is substantially the same as the first and second regulators 22, 23 of FIG. 3. The dividing ratio of the resistor string 33 and the reference voltage VR of the reference voltage generation circuit 35 in the third regulator 41 are set in accordance with the optimum functional voltage of the digital processing circuit 12. Further, the third regulator 41 operates in accordance with the control signal CE.

The signal processor 21' of the second embodiment has the advantage described below.

In the signal processor 21', when the control signal CE stops the operation of the regulators 22A, 23, 41, the supply of the first to third adjustment voltages VA–VC is stopped. Further, the operations of the reference voltage generation circuit 35 and the comparator 34 in the regulators 22A, 23, 41 are stopped. This stops the supply of the power supply voltage to the analog processing circuit 10 and the digital processing circuit 12 and prevents power consumption by the regulators 22A, 23, 41 when the CCD image sensor 3 stops operating. As a result, the power consumption of the signal processor 21' is reduced.

Figure 6:
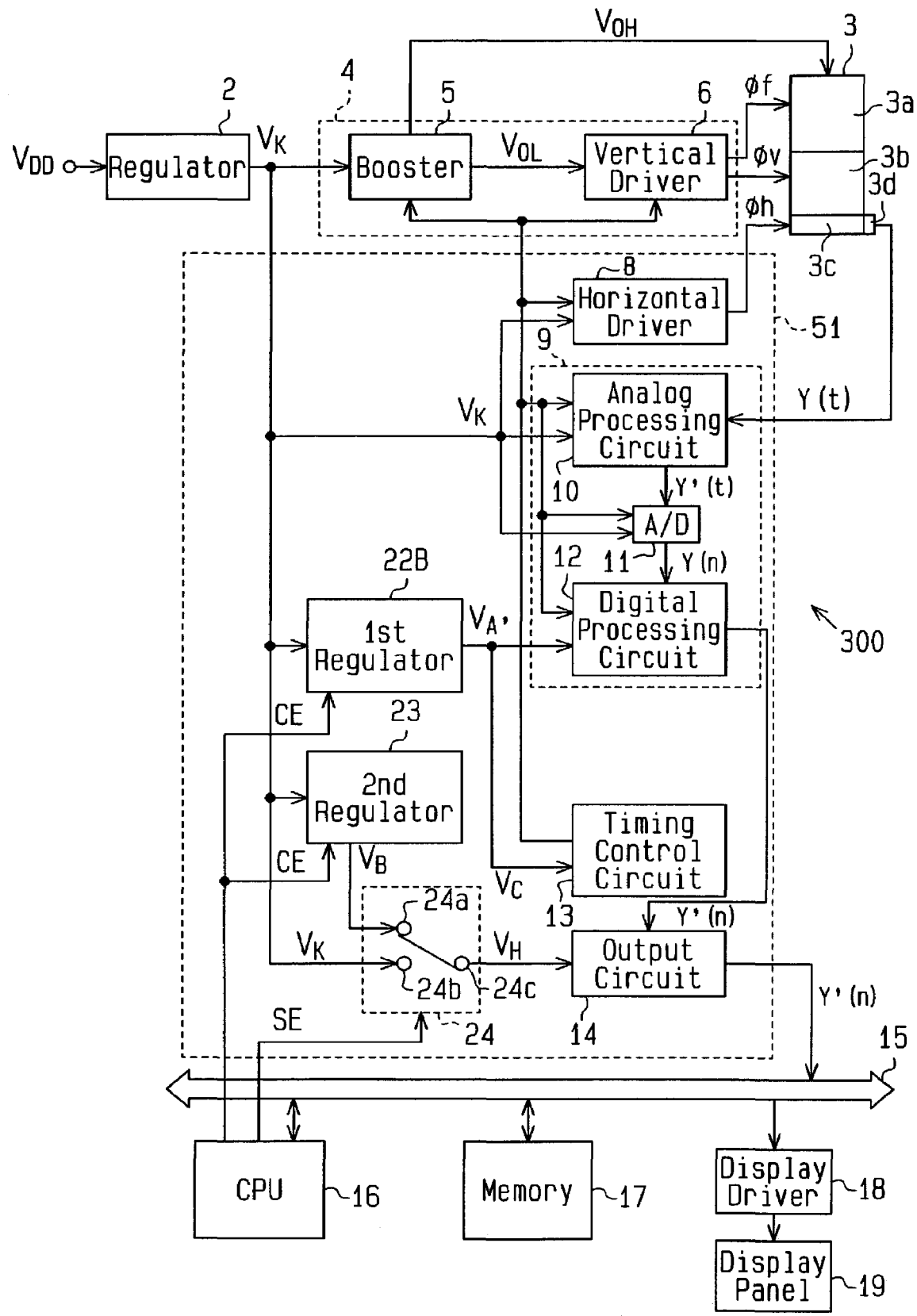
FIG. 6 is a schematic block diagram of an imaging apparatus having an image signal processor according to a third embodiment of the present invention.

FIG. 6 is a schematic block diagram of an imaging apparatus 300 having an image signal processor 51 according to a third embodiment of the present invention. The imaging apparatus 300 includes the external regulator 2 of FIG. 1. The signal processor 51 of the third embodiment thus does not have the first regulator 22A of the second embodiment.

In the third embodiment, the output voltage VK of the external regulator 2 is supplied to the analog processing circuit 10, the A/D converter 11, the first regulator 22B, the second regulator 23, and the switch circuit 24.

The output voltage (regulated voltage) VK of the external regulator 2 is set at the optimum operational voltage of the horizontal driver 8, the analog processing circuit 10, and the A/D converter 11 (e.g.. 2.5V). In the third embodiment, the output voltage VK of the external regulator 2 is the power supply voltage of the signal processor 51.

The first regulator 22B, which is connected to the digital processing circuit 12 and the timing control circuit 13, generates a first regulated voltage VA', which is substantially equal to the optimum operational voltage of the digital processing circuit 12 and the timing control circuit 13 (e.g., 2.0V). The first regulator 22B, which is supplied with the regulated voltage VK from the external regulator 2, generates a first regulated voltage VA' in accordance with the regulated voltage VK.

The second regulator 23, which is supplied with the regulated voltage VK from the external regulator 2, generates a second regulated voltage VB', which is substantially equal to the optimum operational voltage of the output circuit 14 (e.g., 1.8V).

The switch circuit 24 is connected to the second regulator 23 and the external regulator 2. In response to the control signal SE, the switch circuit 24 supplies either one of the second regulated voltage VB' and the regulated voltage VK.

Figure 7:
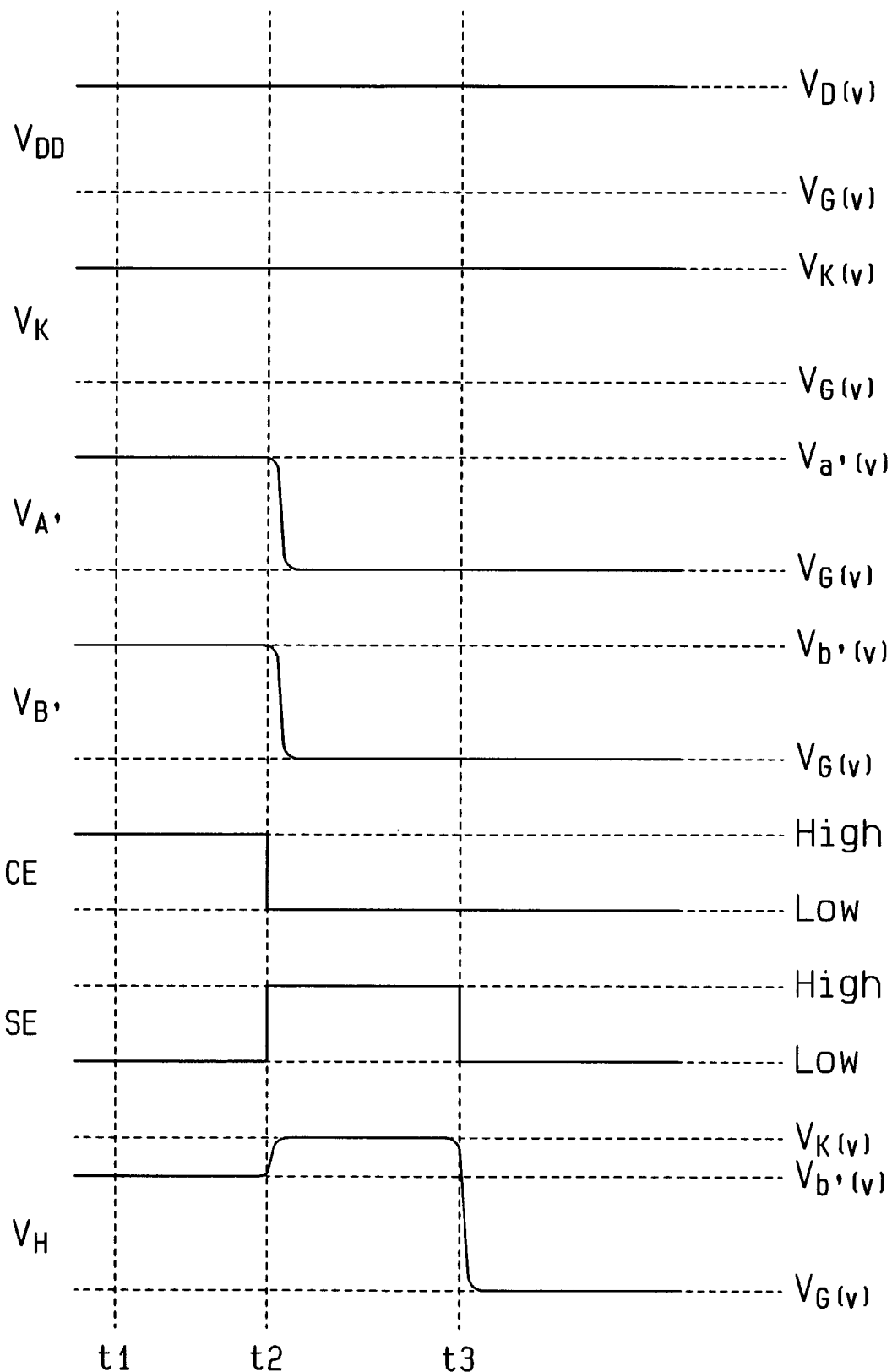
FIG. 7 is a timing chart illustrating the operation of the image signal processor of FIG. 6.

FIG. 7 is a timing chart illustrating the operation of the signal processor 51. At timing t1 to t2 during which the imaging apparatus 300 and the external device are both operating, the input terminal 24a of the switch circuit 24 is selected and the output circuit 14 is supplied with the second regulated voltage VB'. At timing t2 to t3 during which only the imaging apparatus 300 stops operating, the input terminal 24b of the switch circuit 24 is selected and the output circuit 14 is supplied with the regulated voltage VK.

Subsequent to timing t3 at which the imaging apparatus 300 and the external device both stop operating, the input terminal 24a of the switch circuit 24 is selected, and the output circuit 14 is supplied with the output potential VG[V] (e.g., 0V) of the second regulator 23. As a result, the output circuit 14 is supplied with voltage that is in accordance with the operating state of the imaging apparatus 300 and the external device.

The signal processor 51 of the third embodiment has the advantages described below.

Each circuit in the signal processor 51 is supplied with the optimal voltage in the same manner as the first and second embodiments. Further, the voltage supplied to the output circuit 14 is switched in accordance with the operating state of the imaging apparatus 300 and the external device. This improves the operation characteristics of the signal processor 51. Further, when the imaging apparatus 300 is not operating or when the imaging apparatus 300 and the external device are both not operating, the consumption of unnecessary power is prevented.

It should be apparent to those skilled in the art that the present invention may be embodied in many other specific forms without departing from the spirit or scope of the invention. Particularly, it should be understood that the present invention may be embodied in the following forms.

In each embodiment, the operational voltage supplied to the horizontal driver 8 may be varied in accordance with, for example, the specification of the CCD image sensor 3. For example, if the optimum operational voltage of the horizontal driver 8 is closer to the operational voltage of the digital processing circuit 12 and the timing control circuit 13 than the operational voltage of the analog processing circuit 10 and the A/D converter 11, the horizontal driver 8 may be supplied with substantially the same voltage as the digital processing circuit 12 and the timing control circuit 13.

The present examples and embodiments are to be considered as illustrative and not restrictive, and the invention is not to be limited to the details given herein, but may be modified within the scope and equivalence of the appended claims.

What is claimed is:

1. An image signal processor connected between a solid-state imaging device, which generates a first image signal, and an external device, the image signal processor comprising:
    a first regulator supplied with a power supply voltage to generate a first regulated voltage that is in accordance with an output level of the solid-state imaging device;
    a second regulator supplied with the power supply voltage to generate a second regulated voltage that is in accordance with an input level of the external device;
    a switch circuit connected to the second regulator to select either one of the power supply voltage and the second regulated voltage in accordance with the operating state of at least one of the solid-state imaging device and the external device;
    a signal processing circuit connected to the solid-state imaging device and the first regulator, supplied with the first regulated voltage from the first regulator, for operating with the first regulated voltage, wherein the signal processing circuit receives the first image signal from the solid-state imaging device, performs a predetermined signal processing on the first image signal, and generates a second image signal that complies with a predetermined format; and
    an output circuit connected to the switch circuit and the signal processing circuit, for operating with the one of the power supply voltage and the second regulated voltage selected by the switch circuit, wherein the output circuit provides the second image signal to the external device,
    wherein the signal processing circuit is supplied with the first regulated voltage and the output circuit is supplied with the second regulated voltage when the solid-state imaging device is operating, and the signal processing circuit is supplied with a voltage at a ground level and the output circuit is supplied with the power supply voltage when the solid-state imaging device stops operating while the external device is operating.

2. The image signal processor according to claim 1, wherein:
    the first and second regulators respectively stop generating the first and second regulated voltage during at least part of the time in which the solid-state imaging device stops operating;

3. The image signal processor according to claim 2, wherein the first and second regulators each include:
    a regulate transistor;
    a comparator connected to the regulate transistor to control activation and de-activation of the regulate transistor; and
    a reference voltage generation circuit for generating a reference voltage and providing the reference voltage to the comparator;
    wherein the comparator and the reference voltage generation circuit stop operating during at least part of the time in which the solid-state imaging device stops operating.

4. The image signal processor according to claim 1, wherein the first regulator, the second regulator, and the switch circuit are supplied with the power supply voltage from a battery connected to the image signal processor.

5. The image signal processor according to claim 1, further comprising:
    a third regulator supplied with the power supply voltage to generate a third regulated voltage;
    wherein the signal processing circuit includes:
    an analog processing circuit connected to the first regulator, for operating with the first regulated voltage, wherein the analog processing circuit performs a predetermined analog signal processing on the first image signal; and
    a digital processing circuit connected to the third regulator, for operating with the third regulated voltage, wherein the digital processing circuit performs a predetermined digital signal processing on a digital first image signal converted from the first image signal, which has undergone the analog signal processing, to generate the second image signal.

6. The image signal processor according to claim 5, wherein the third regulated voltage is less than the first regulated voltage.

7. The image signal processor according to claim 5, wherein the first, second, and third regulators stop generating the first, second, and third regulated voltages during at least part of the time in which the solid-state imaging device stops operating.

8. The image signal processor according to claim 5, wherein the first, second, and third regulator each include:
    a regulate transistor;
    a comparator connected to the regulate transistor to control activation and de-activation of the regulate transistor; and
    a reference voltage generation circuit for generating a reference voltage and supplying the reference voltage to the comparator;
    wherein the comparator and the reference voltage generation circuit stop operating during at least part of the time in which the solid-state imaging device stops operating.

9. The image signal processor according to claim 5, wherein the first to third regulators and the switch circuit are supplied with the power supply voltage from a battery connected to the image signal processor.

10. The image signal processor according to claim 5, wherein the image signal processor includes:
    an analog processing circuit supplied with the power supply voltage, for operating with the first regulated voltage, wherein the analog processing circuit performs a predetermined analog signal processing on the first image signal; and
    a digital processing circuit connected to the first regulator, for operating with the first regulated voltage, wherein the digital processing circuit performs a predetermined digital signal processing on a digital first image signal converted from the first image signal, which has undergone the analog signal processing, to generate second image signal.

11. The image signal processor according to claim 10, wherein the analog processing circuit, the first regulator, the second regulator, and the switch circuit are supplied with the power supply voltage from an external regulator connected to the image signal processor.

12. A method for supplying power supply voltage to an image signal processor connected between a solid-state imaging device and an external device, wherein the image signal processor includes a signal processing circuit for performing a predetermined signal processing on a first image signal to generate a second image signal, which complies with a predetermined format, and an output circuit connected to the signal processing circuit and the external device to provide the external device with the second image signal, the method comprising:

receiving power supply voltage and generating a first regulated voltage that is in accordance with an output level of the solid-state imaging device;

receiving power supply voltage and generating a second regulated voltage that is in accordance with an input level of the external device;

supplying the signal processing circuit with the first regulated voltage and the output circuit with the second regulated voltage when the solid-state imaging device and the external device are operating;

supplying the signal processing circuit with a voltage at a ground level and the output circuit with the power supply voltage when the solid-state imaging device stop operating while the external device is operating; and supplying the signal processing circuit and the output circuit with the voltage at the ground level when the solid-state imaging device and the external device stop operating.

\* \* \* \* \*